M. F. TORAZZI AND R. G. KNOPH.
NUT AND BOLT.
APPLICATION FILED MAY 10, 1918.
1,334,977.
Patented Mar. 30, 1920.
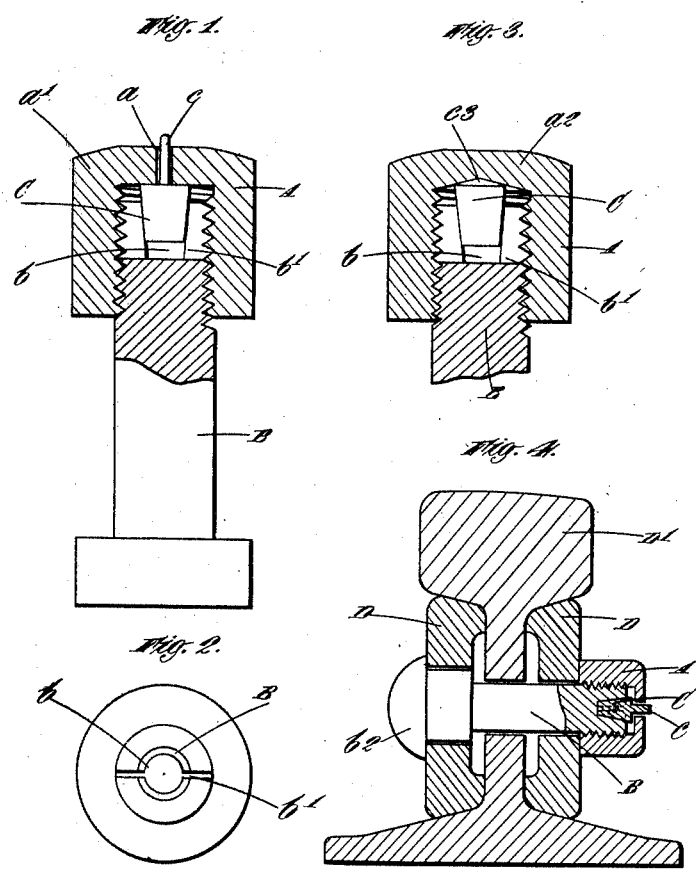

UNITED STATES PATENT OFFICE.

MARIO FRANCESCO TORAZZI, OF WESTMINSTER, LONDON, AND ROBERT GORDON KNOPH, OF WALNEY, BARROW-IN-FURNESS, ENGLAND, ASSIGNORS TO THE KINGSLAND RESEARCH SYNDICATE LIMITED, OF WESTMINSTER, ENGLAND.

NUT AND BOLT.

1,334,977. Specification of Letters Patent. Patented Mar. 30, 1920.

Application filed May 10, 1918. Serial No. 233,614.

*To all whom it may concern:*

Be it known that we, MARIO FRANCESCO TORAZZI and ROBERT GORDON KNOPH, both subjects of the King of Great Britain, residing, respectively, at 16 Victoria street, Westminster, in the county of London, England, and 39 Powerful street, Walney, Barrow-in-Furness, in the county of Lancaster, England, have invented certain new and useful Improvements in or Relating to Nuts and Bolts, of which the following is a specification.

This invention relates to nuts and bolts and provides improved means by which the nut may be secured on the end of the bolt so as to prevent accidental loosening while allowing of unscrewing in the usual manner.

According to this invention an expanding member is fitted in a recess in the split end of a bolt and the nut on screwing up causes the said member to expand the end of the bolt within the nut. The nut is preferably closed in at the end so as to bear upon the base of the member, which is usually in the form of a conical plug. The device is especially applicable for use with railway fish bolts but is adapted for application to bolts for other purposes.

In order that the said invention may be clearly understood and readily carried into effect we will describe the same more fully with reference to the accompanying drawings, in which:—

Figure 1 is a section of a nut and bolt embodying this invention.

Fig. 2 is a plan of the end of the bolt.

Fig. 3 shows in section a modified form of nut and conical plug, and

Fig. 4 shows the application to a fish plate connection.

A is the nut, B is the bolt formed with the slightly coned recess $b$ and the cross cut $b'$ which divides the screwed end. C is the expanding cone or plug, usually of steel.

Referring to Figs. 1 and 2 the cone C is provided with a small tail $c$ which facilitates the fitting of the nut and cone, passing through the small hole $a$ in the otherwise closed in top $a'$ of the nut, the tail $c$ acting as a centering member. When the cone is placed in the recess $b$ in the end of the bolt and the nut A is fitted on and screwed down tight, the cone C acts against the sides of the split end of the screw and expands them tightly against the screw thread of the nut. The result is to bind the nut securely on the end of the bolt in a manner which effectually prevents accidental loosening, but the action is such that the nut can be unscrewed in the usual manner by exerting a force not greatly in excess of that employed to screw up the nut. To facilitate the unscrewing the extremity of the tail $c$ is burred over the top of the nut after the latter is screwed up, conveniently by using the spanner employed on the nut, and, on unscrewing, the cone is directly lifted up by the nut through the tail which it engages.

In Fig. 3 the nut is shown with a completely closed top $a^2$ slightly coned inside to center the cone, the base $C^3$ of which is also slightly coned to correspond. The action is the same as in the previous case, except for the lifting of the cone through the tail.

The expanding member is shown of conical form for the shape is immaterial as long as the member and the recess in the bolt are so selected as to give the desired expanding action on screwing up the nut.

What we claim and desire to secure by Letters Patent of the United States is:

1. A securing device for nuts and bolts comprising a bolt having a split end and a recess in the said end, a nut having a covered top up to which the screw thread extends and adapted to screw upon an inclose the split end of the bolt, and an expanding member lying within the bolt recess and projecting at its outer end against the closed top of the nut so as to expand the split end of the bolt against the thread of the nut, which thread extends beyond the end of the bolt.

2. A securing device for nuts and bolts comprising a bolt having a split end and a recess in the said end, a nut having a covered top and adapted to screw upon and inclose the split end of the bolt, an expanding member lying within the bolt recess and projecting at its outer end against the closed top of the nut so as to expand the split end of the bolt against the thread of the nut, and a tail extending from the outer end of the said expanding member through a hole in the covered top of the nut, the tail projecting above the said top and adapted to be bent over after securing the nut in position, for the purpose specified.

In witness whereof we affix our signatures.

MARIO FRANCESCO TORAZZI.
ROBERT GORDON KNOPH.